(12) United States Patent
Kang et al.

(10) Patent No.: US 10,225,508 B2
(45) Date of Patent: Mar. 5, 2019

(54) DISPLAY DEVICE AND CONTROL METHOD THEREFOR

(71) Applicant: SAMSUNG ELECTRONICS CO., LTD., Suwon-si, Gyeonggi-do (KR)

(72) Inventors: Jun Seok Kang, Incheon (KR); Kyoung Shin Jin, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/744,375

(22) PCT Filed: Jul. 7, 2016

(86) PCT No.: PCT/KR2016/007381
§ 371 (c)(1),
(2) Date: Jan. 12, 2018

(87) PCT Pub. No.: WO2017/010740
PCT Pub. Date: Jan. 19, 2017

(65) Prior Publication Data
US 2018/0213176 A1    Jul. 26, 2018

(30) Foreign Application Priority Data

Jul. 15, 2015 (KR) .......................... 10-2015-0100315

(51) Int. Cl.
*H04N 5/50* (2006.01)
*H04N 5/64* (2006.01)
(Continued)

(52) U.S. Cl.
CPC ................. *H04N 5/50* (2013.01); *H01Q 1/12* (2013.01); *H01Q 1/44* (2013.01); *H04N 5/64* (2013.01)

(58) Field of Classification Search
CPC ............... H04N 5/50; H04N 5/64; H04N 5/44
(Continued)

(56) References Cited

U.S. PATENT DOCUMENTS

| 3,604,007 A | 9/1971 | Solby |
| 5,210,611 A * | 5/1993 | Yee .......................... H04N 5/44 348/473 |
| 2010/0035540 A1 | 2/2010 | Kim et al. |

FOREIGN PATENT DOCUMENTS

| EP | 1 983 605 | 10/2008 |
| JP | 2005-295135 | 10/2005 |

(Continued)

OTHER PUBLICATIONS

International Search Report for PCT/KR2016/007381, dated Oct. 12, 2016, 5 pages.

(Continued)

*Primary Examiner* — Sherrie Hsia
(74) *Attorney, Agent, or Firm* — Nixon & Vanderhye, P.C.

(57) ABSTRACT

Provided are a display device and a control method therefor, which uses, as an antenna, a support unit for supporting a display panel, so as to enable a user of the display device to view a terrestrial broadcast without having a separate antenna, and matches the signal reception characteristic of the support unit to each broadcast channel, so as to allow the support unit to function as an antenna having an improved reception rate. A display device according to an embodiment comprises: a support unit which supports a body and receives a broadcast signal transmitted from the outside; a matching unit which is disposed in the body so as to match the signal reception characteristic of the support unit to a frequency band allocated to a broadcast channel; a tuning unit which selects a signal of the frequency band allocated to the broadcast channel among broadcast signals output (Continued)

from the matching unit; and a display unit which displays an image signal included in the selected signal of the frequency band.

13 Claims, 22 Drawing Sheets

(51) Int. Cl.
*H04N 5/44* (2011.01)
*H01Q 1/12* (2006.01)
*H01Q 1/44* (2006.01)

(58) Field of Classification Search
USPC ........................................ 348/731, 725, 825
See application file for complete search history.

(56) References Cited

FOREIGN PATENT DOCUMENTS

| | | |
|---|---|---|
| JP | 2009-044262 | 2/2009 |
| JP | 4304148 | 7/2009 |
| WO | WO 2014/142411 | 9/2014 |

OTHER PUBLICATIONS

Written Opinion of the ISA for PCT/KR2016/007381, dated Oct. 12, 2016, 5 pages.
Extended Search Report dated May 2, 2018 in counterpart European Patent Application No. EP16824657.7.
Communication pursuant to Article 94(3) EPC dated Oct. 26, 2018 in counterpart European Patent Application No. EP16824657.7.

* cited by examiner

FIG.3
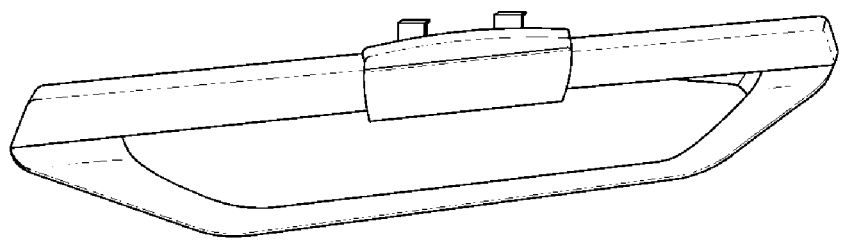
(a)
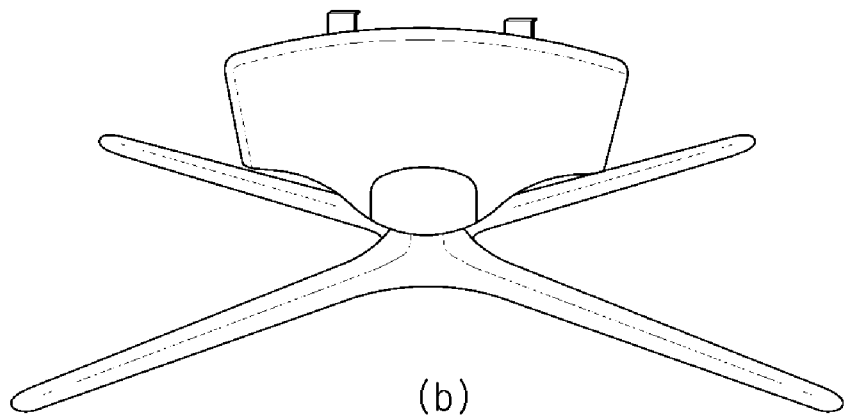
(b)

FIG.4
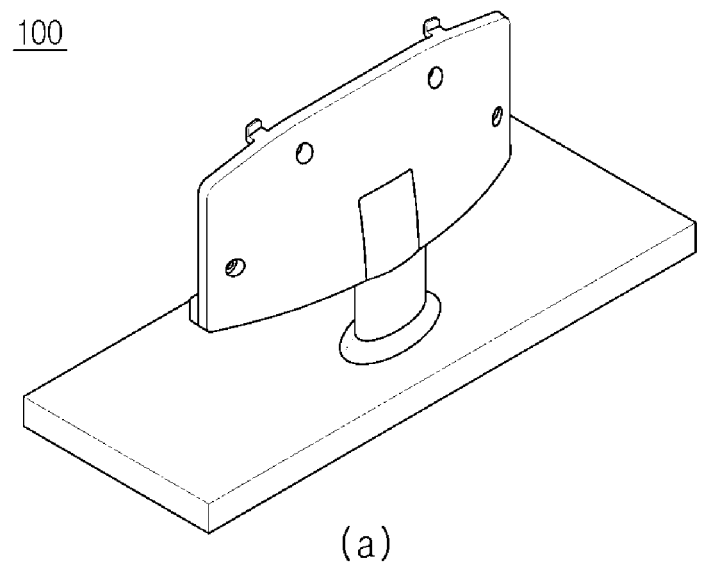
(a)
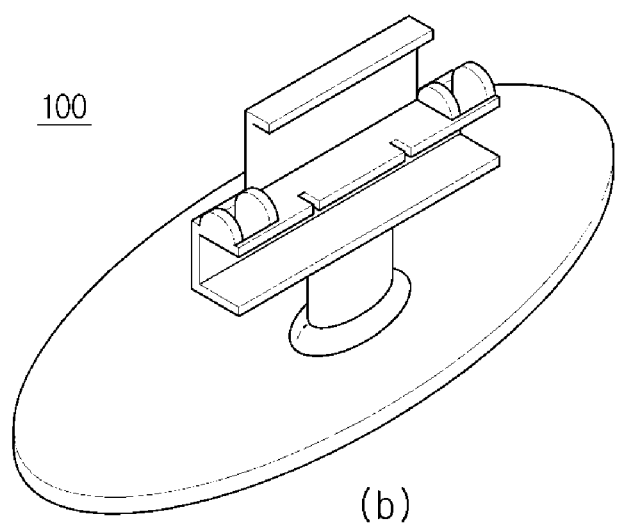
(b)

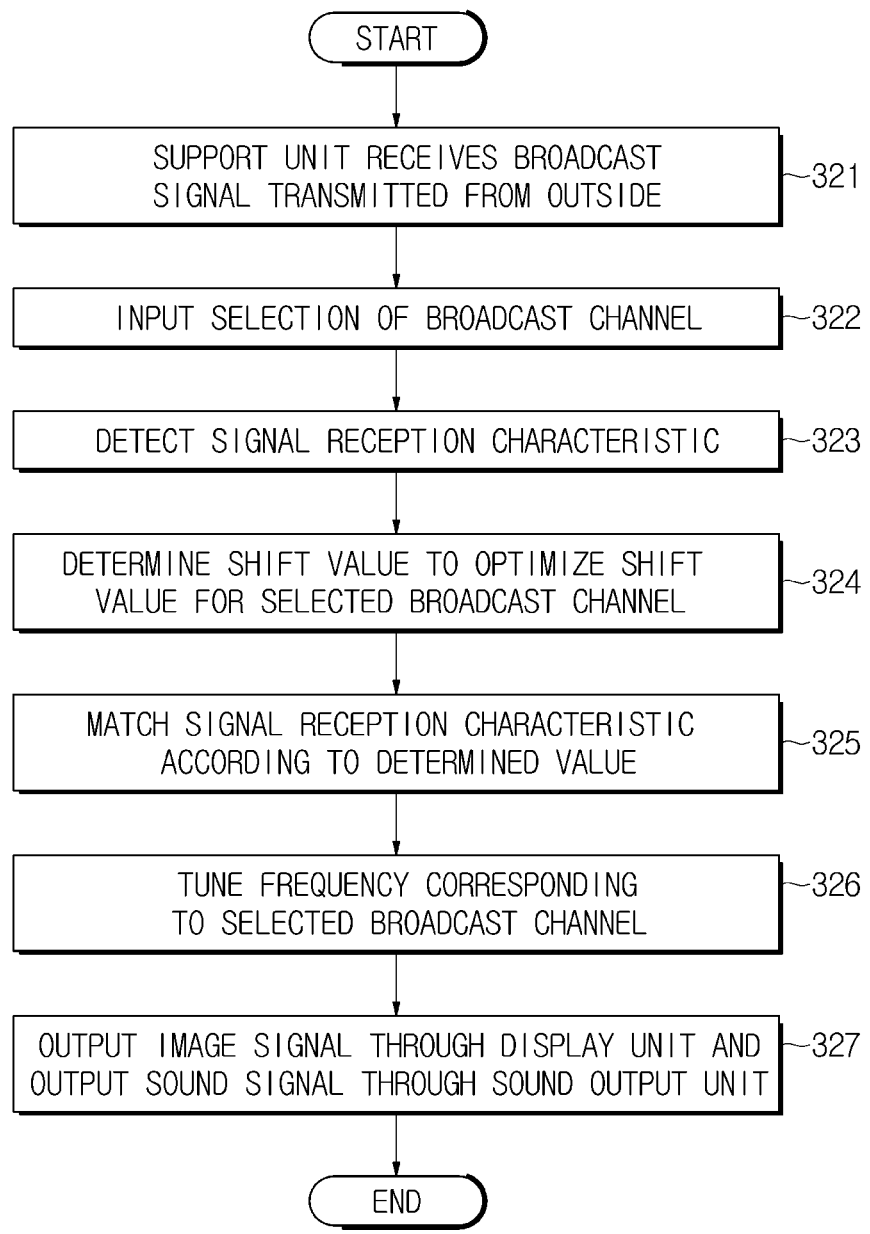

DISPLAY DEVICE AND CONTROL METHOD THEREFOR

This application is the U.S. national phase of International Application No. PCT/KR2016/007381 filed Jul. 7, 2016, which designated the U.S. and claims priority to KR Patent Application No. 10-2015-0100315 filed Jul. 15, 2015, the entire contents of each of which are hereby incorporated by reference.

TECHNICAL FIELD

The present disclosure relates to a display device using a support unit configured to support a display panel, and a method of controlling the same.

BACKGROUND ART

Generally, in order to view a terrestrial broadcast through a display device, an antenna for receiving a broadcast signal transmitted from a broadcasting station is necessary.

Accordingly, in order to view the terrestrial broadcast, a user has to purchase a separate antenna which will be connected to the display device or a broadcast signal received by a public antenna outside a building has to be transmitted to the display device through a coaxial cable connected to the display device.

However, since not all buildings are provided with public antennas, a separate indoor antenna or a separate outdoor antenna is required in an environment in which a public antenna is not provided, and providing an antenna separately from a display device, such as a television, can be inconvenient to a user.

DISCLOSURE

Technical Problem

The present disclosure is directed to providing a display device capable of viewing a terrestrial broadcast without a separate antenna being provided to a user of the display device by using a support unit, which supports a display panel and serves as an antenna with an improved reception rate by suitably matching a signal reception characteristic of the support unit with each broadcast channel, and a method of controlling the same.

Technical Solution

One aspect of the present disclosure provides a display device including a support unit configured to support a body and receive a broadcast signal transmitted from an outside thereof, a matching unit disposed in the body and configured to match a signal reception characteristic of the support unit to a frequency band allocated to a broadcast channel, a tuning unit configured to select a signal in the frequency band allocated to the broadcast channel among broadcast signals output from the matching unit, and a display unit configured to display an image signal included in the selected signal of the frequency band.

The matching unit may include at least one variable capacitor.

The matching unit may further include at least one inductor.

The display device may further include a control unit configured to, when a selection of the broadcast channel is input, control capacitance of the variable capacitor such that the signal reception characteristic matches a frequency band allocated to the selected broadcast channel.

The signal reception characteristic may include a scattering (S) parameter.

The matching unit may further include a low noise amplifier disposed on an output terminal thereof.

The display device may further include a detection unit configured to detect the signal reception characteristic of the support unit.

The control unit may generate a control signal for controlling the capacitance of the variable capacitor on the basis of the detected signal reception characteristic and the frequency band allocated to the selected broadcast channel.

The control unit may determine a shift value of the detected signal reception characteristic for resonating the signal in the frequency band allocated to the selected broadcast channel and may determine the capacitance of the variable capacitor according to the determined shift value.

The control unit may generate a control signal for controlling the capacitance of the variable capacitor on the basis of a frequency band allocated to a previously selected broadcast channel and the frequency band allocated to the currently selected broadcast channel.

The support unit may include a metal material.

The matching unit may be disposed on an inner surface of a back cover of the body and may further include a feed line configured to connect a neck portion of the support unit and the matching unit.

The display device may further include a metal connecting member configured to pass through the back cover of the body and the neck portion of the support unit to connect the feed line and the neck portion of the support unit.

Another aspect of the present disclosure provides a method of controlling a display device including a body configured to display an image signal included in a broadcast signal transmitted from an outside thereof and a support unit configured to support the body includes receiving, by the support unit, a broadcast signal, matching a signal reception characteristic of the support unit to a frequency band allocated to a broadcast channel, selecting a signal in the frequency band allocated to the broadcast channel among broadcast signals on which a matching process is performed, and displaying an image signal included in the selected signal in the frequency band.

The matching of the signal reception characteristic of the support unit to the frequency band allocated to the broadcast channel may include inputting the broadcast signal received by the support unit to a matching circuit including at least one variable capacitor.

The matching of the signal reception characteristic of the support unit to the frequency band allocated to the broadcast channel may further include controlling capacitance of the variable capacitor such that the broadcast signal received by the support unit is resonated in the frequency band allocated to the broadcast channel The signal reception characteristic may include the S parameter.

The method may further include detecting the signal reception characteristic of the support unit.

The matching of the signal reception characteristic of the support unit to the frequency band allocated to the broadcast channel may include determining capacitance of the variable capacitor on the basis of the detected signal reception characteristic and the frequency band allocated to the broadcast channel The matching of the signal reception characteristic of the support unit to the frequency band allocated to the broadcast channel may include determining a shift value of the detected signal reception characteristic for resonating the signal in the frequency band allocated to the broadcast channel and determining capacitance of the variable capacitor according to the determined shift value.

The method may further include receiving a selection of the broadcast channel, and the matching of the signal reception characteristic of the support unit to the frequency band allocated to the broadcast channel may include determining the shift value of the signal reception characteristic on the basis of the frequency band allocated to a previously selected broadcast channel and the frequency band allocated to the currently selected broadcast channel.

Advantageous Effects

According to a display device and a method of controlling the same according to one aspect of the present disclosure, a user of the display device can view a terrestrial broadcast even when a separate antenna is not provided to the user by using a support unit configured to support a display panel as an antenna, and the support unit can serve as an antenna with an improved reception rate by suitably matching a signal reception characteristic of the support unit with each broadcast channel.

DESCRIPTION OF DRAWINGS

FIGS. 3 to 6 are views illustrating examples of a shape of a support unit included in the display device according to one embodiment.

FIG. 22 is a flowchart for describing an embodiment including a process of detecting a signal reception characteristic in the control method of a display device according to one embodiment.

MODES OF THE INVENTION

Hereinafter, embodiments of the present disclosure will be described in detail with reference to the accompanying drawings.

Figure 1:
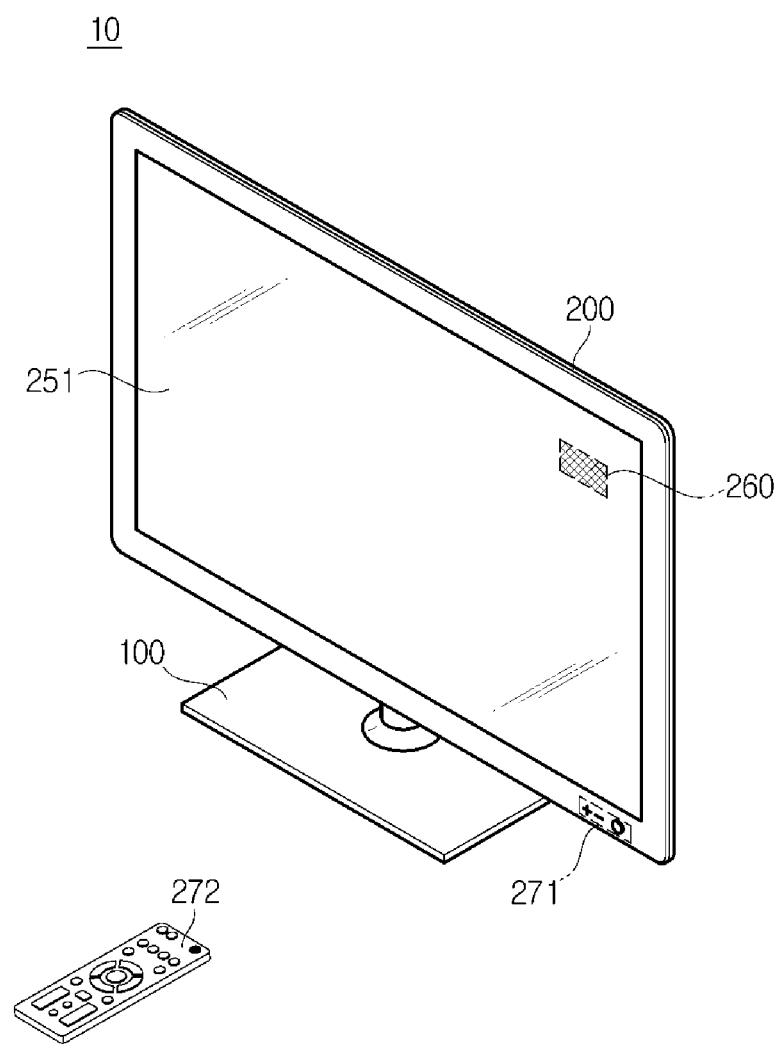
FIG. 1 is a perspective view illustrating an exterior of a display device according to one embodiment.
Figure 2:
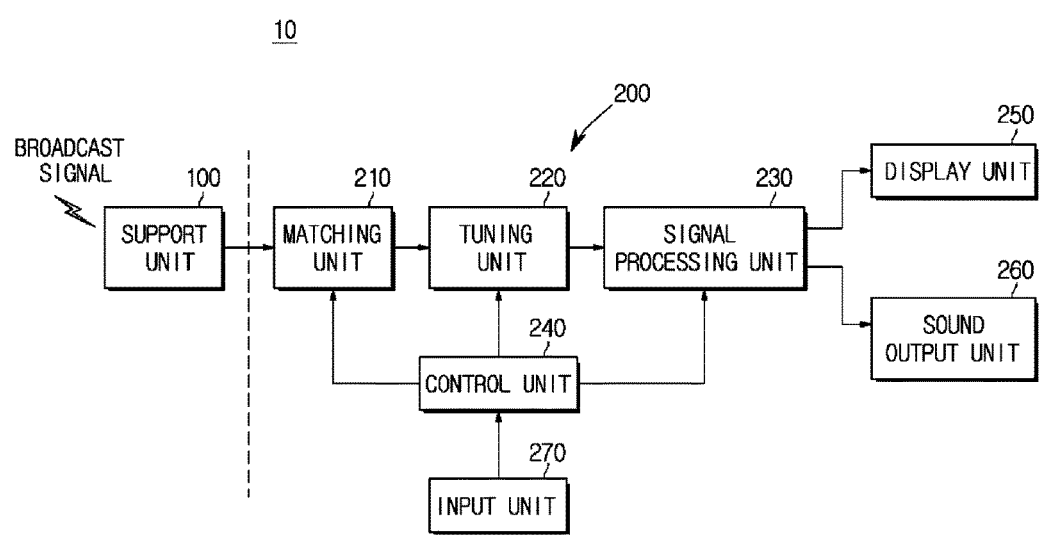
FIG. 2 is a control block diagram illustrating the display device according to one embodiment.

FIG. 1 is a perspective view illustrating an exterior of a display device according to one embodiment, and FIG. 2 is a control block diagram illustrating the display device according to one embodiment.

A display device 10 according to one embodiment refers to a device capable of receiving and processing a broadcast signal and outputting an image and a sound included in the broadcast signal transmitted from an outside of the display device 10. The broadcast signal may be transmitted from a broadcasting station.

For example, since the display device 10 may be a television (TV), in the following embodiments, a case in which the display device 10 is a TV will be described as an example. However, the display device 10 included in the embodiments is not limited to a TV, and the display device 10 is not limited to a name and kind of a device as long as the device may receive and output a broadcast signal.

Referring to FIG. 1, the display device 10 includes a body 200 configured to form an exterior of the display device 10 and accommodate various components configuring the display device 10, and a support unit 100 configured to support the body 200.

A display panel 251 configured to display an image may be disposed on a front surface of the body 200, and a body input unit 271 configured to receive a control command from a user may be formed on at least one area of the front surface of the body 200.

The body input unit 271 may be implemented in a button or touch pad type and may also be implemented as a dial or jog shuttle type turned by a user.

Also, in addition to the body input unit 271 provided in the body, the display device 10 may further include a remote input unit 272, such as a remote controller, so that the user may input a control command even when the remote input unit 272 is separated a distance from the body 200.

Examples of a control command input by the user include a power on/off, a sound level adjustment, a broadcast channel selection, adjusting screen properties, such as luminance, brightness, and chroma, and the like.

Although a sound output unit 260 configured to output a sound may be formed on at least one area of a rear surface of the body 200, this is only one example applicable to the display device 10, and since the sound output unit 260 may be provided on the front surface or a side surface of body 200, the number or locations of the sound output units 260 are not limited.

According to the example in FIG. 1, the support unit 100 is provided under the body 200 in a stand type, and thus the body 200 may be stably disposed on a lateral plane. However, since the example of the support unit 100 is not limited thereto, the support unit 100 may be provided in a bracket type on the rear surface of the body 200, as described below, such that the body 200 may be installed on a wall. A kind of the support unit 100 will be described below.

The support unit 100 may be formed of at least one metal selected from the group including steel, stainless steel, aluminum, copper, and zinc, or may be formed of an alloy having at least two metals selected from the group. However, the metals are only examples applicable to the example of the support unit 100, and the support unit 100 may be formed of a metal material having conductivity to serve as an antenna.

Referring to FIG. 2, the support unit 100 itself may serve as an antenna and may receive a broadcast signal transmitted from the outside thereof.

Since the broadcast signal received by the support unit 100 is transmitted to the body 200, the body 200 may include a matching unit 210 configured to suitably match a signal reception characteristic of the support unit 100 to a broadcast channel, a tuning unit 220 configured to select or extract a signal corresponding to a selected broadcast channel among broadcast signals output by the matching unit 210, a signal processing unit 230 configured to process the selected broadcast signal to be a type of a signal which may be output, a control unit 240 configured to control operations of the matching unit 210, the tuning unit 220, and the signal processing unit 230, a display unit 250 configured to display an image included in the broadcast signal, the sound output unit 260 configured to output a sound included in the broadcast signal, and an input unit 270 configured to receive a control command from a user. The input unit 270 includes the body input unit 271 and the remote input unit 272 which are described above.

FIGS. 3 to 6 are views illustrating examples of a shape of a support unit included in the display device according to one embodiment.

Figure 5:
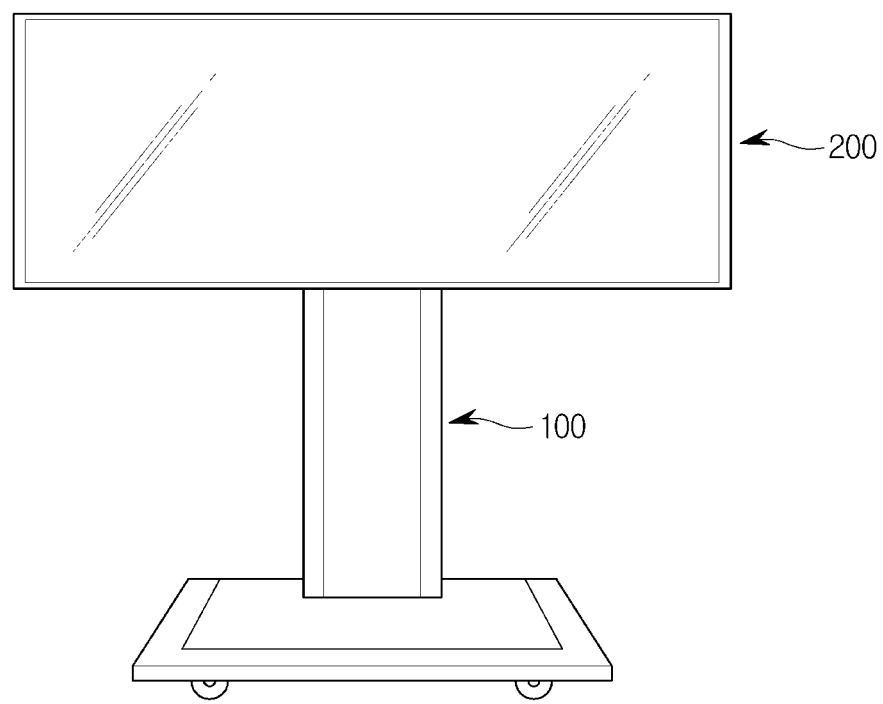

When the support unit 100 is implemented in a stand type, a plurality of legs configured to extend from one center point are implemented to support the body (see FIGS. 3A and 3B), as shown in FIG. 3, and a polygonal plane or an elliptical plane is implemented to support the body (see FIGS. 4A and 4B), as shown in FIG. 4. Also, wheels may be mounted under the support unit 100 to movably implement the support unit 100, as shown in FIG. 5.

Figure 6:
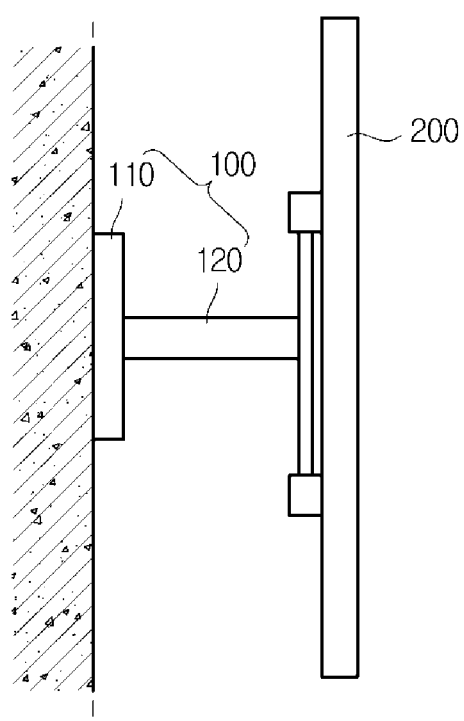

When the support unit 100 is implemented as a wall cradle, as shown in FIG. 6, the support unit 100 may include a fixed bracket 110 fixed on a wall and a connection bracket 120 configured to connect the fixed bracket 110 and the body 200. A length or folding angle of the connection bracket 120 may be manually or automatically adjusted such that the body 200 may be positioned in a direction desired by the user or at a location desired by the user.

As shown in FIGS. 3 to 6, a shape of the support unit 100 may be implemented in a wide variety of ways, and a material thereof may also be variously formed. Also, since the support unit 100 may have various signal reception characteristics according to the shape or the material thereof, the matching unit 210 may suitably match the signal reception characteristics of the support unit 100 to a desired broadcast channel.

Figure 7:
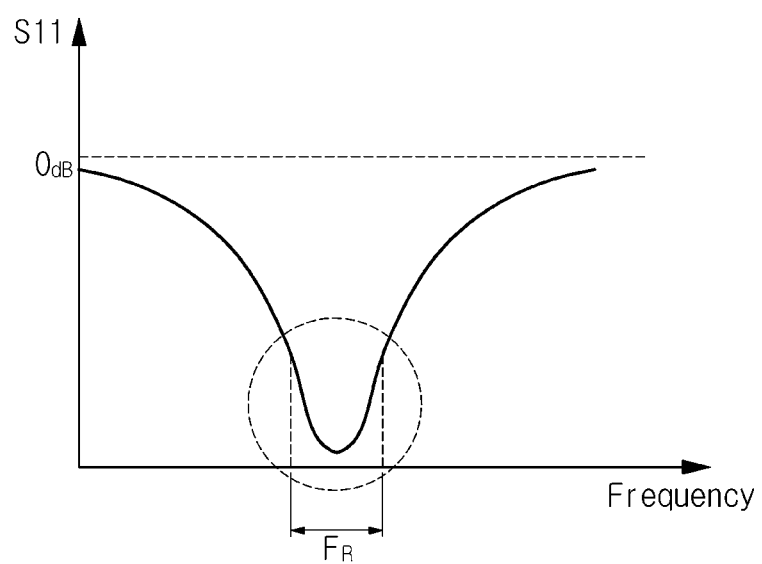
FIG. 7 is a graph illustrating an example of a signal reception characteristic of the support unit.
Figure 8:
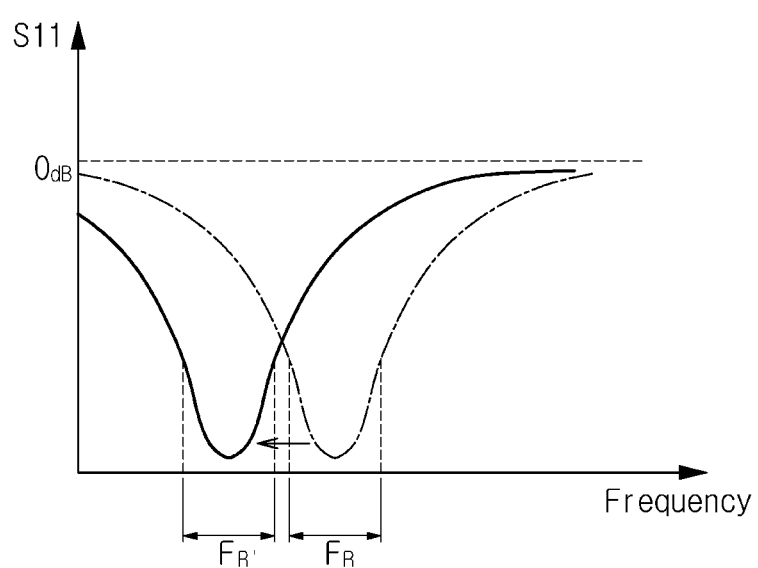
FIGS. 8 and 9 are graphs illustrating examples of a signal reception characteristic shifted by a matching unit.
Figure 9:
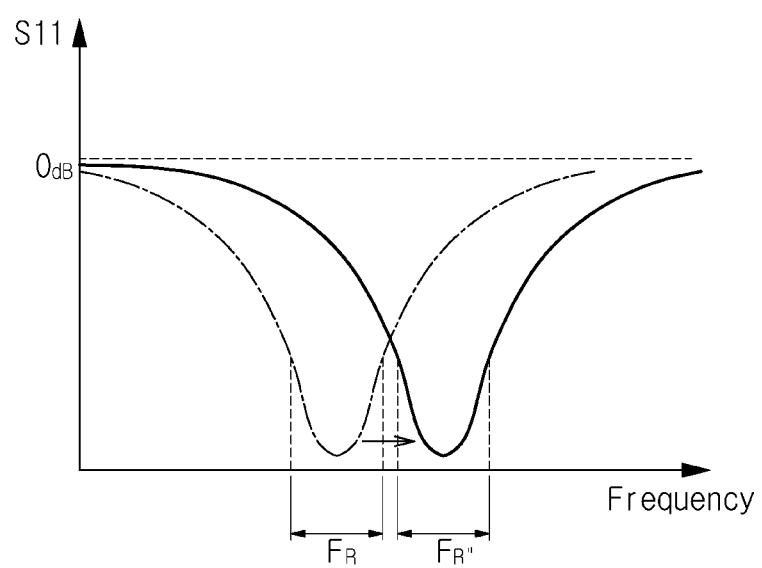

FIG. 7 is a graph illustrating an example of a signal reception characteristic of the support unit, and FIGS. 8 and 9 are graphs illustrating examples of the signal reception characteristic shifted by a matching unit.

Since the broadcast signal received by the support unit 100 corresponds to a radio frequency (RF) signal, the support unit 100 may use a scattering (S) parameter as an example of the signal reception characteristic. The S parameter may be defined as a ratio of an input voltage to an output voltage for each port in a frequency domain and may be shown in a dB scale.

Since the support unit 100 is used as an antenna and has only an input port, an S11 parameter indicating a reflected voltage value may be used. The S11 parameter is also referred to as reflection coefficient.

For example, an S11 parameter of the support unit 100 may show a characteristic shown in FIG. 7. A case, in which the S11 parameter falls sharply in a specific frequency band, means that reflection of the input voltage in the specific frequency band is minimized That is, the case means that resonance of signals occurs in the specific frequency band and signal reception is optimized.

In FIG. 7, since the S11 parameter falls sharply in a frequency band $F_R$, the support unit 100 may resonate frequency signals in the frequency band $F_R$, that is, the support unit 100 is optimized to receive the frequency signals in the frequency band $F_R$.

Meanwhile, signals corresponding to a plurality of broadcast channels are included in a broadcast signal transmitted from the outside of the support unit 100, and various frequency bands are allocated to each of the broadcast channels. The matching unit 210 may match the S11 parameter of the support unit 100 to a broadcasting channel selected by the user or a frequency band of a broadcasting channel set as a default value.

For example, when a frequency band $F_R'$ of the selected broadcast channel is lower than the frequency band $F_R$ corresponding to the S11 parameter of the support unit 100, as shown in FIG. 8, the matching unit 210 may shift the S11 parameter to a low frequency band (toward a left side in the graph).

Further, when a frequency band $F_R''$ of the selected broadcast channel is higher than the frequency band $F_R$, as shown in FIG. 9, the matching unit 210 may shift the S11 parameter to a high frequency band (toward a right side in the graph).

As described above, although the support unit 100 may be formed in various shapes or of various materials and thus may have various S11 parameters, the matching unit 210 corrects the S11 parameter of the support unit 100 according to each of the broadcasting channels, antenna performance of the support unit 100 can be improved.

Figure 10:
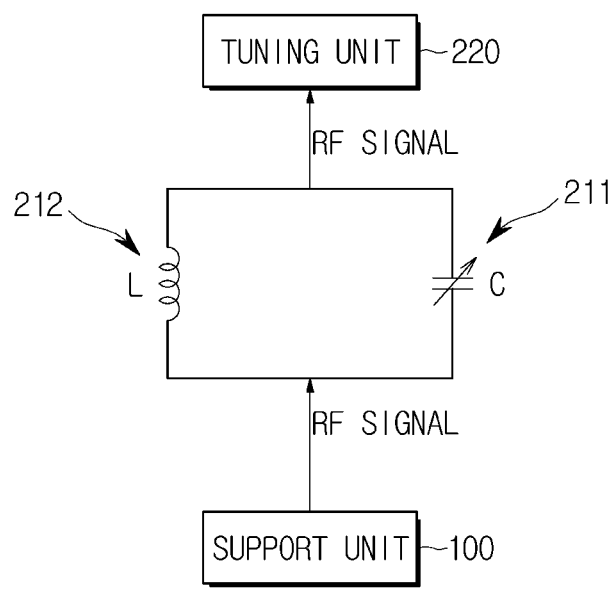
FIGS. 10 and 11 are schematic views illustrating a structure of a circuit forming the matching unit.
Figure 11:
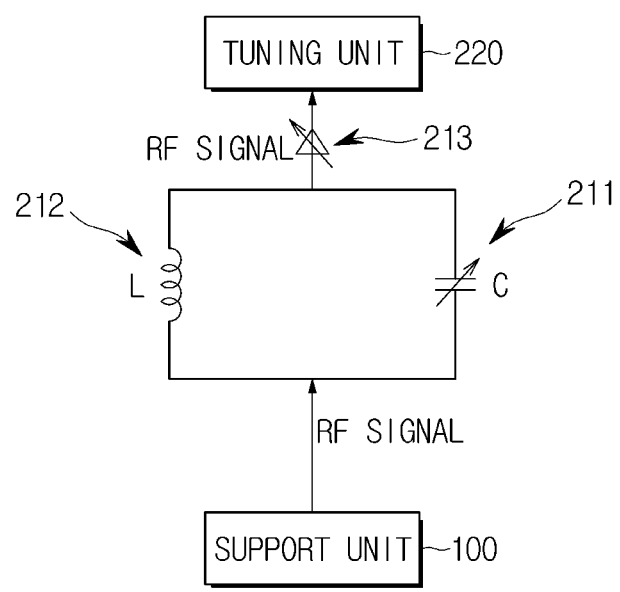

FIGS. 10 and 11 are schematic views illustrating a structure of a circuit forming the matching unit.

Referring to FIG. 10, the circuit forming the matching unit 210 may include at least one variable capacitor 211 and at least one inductor 212. Two or more variable capacitors 211 and inductors 212 may be provided according to signal reception characteristics of the support unit 100 or various design considerations and may further include a resistor in some cases.

Here, since the S11 parameter may be shifted by setting capacitance of the variable capacitor 211 to a value corresponding to the frequency band of the selected broadcast channel, a control signal port, although not shown in the drawing, to which a control signal transmitted from the control unit 240 is input may be provided in a matching circuit included in the matching unit 210.

The control unit 240 may determine a shift value of the S11 parameter required to resonate a signal in the frequency band allocated to the selected broadcast channel, and the matching unit 210 may generate and transmit a control signal which controls the S11 parameter to be shifted according to the determined shift value.

The control signal may include information about the shift value and information about a capacitance value required to be shifted to a corresponding value.

Here, the shift value of the S11 parameter is a value including information about a direction in which the S11 parameter included in the support unit 100 is shifted and a distance of a shift.

The control unit 240 may include a program for performing the above described operations, a memory for storing data required to execute the program, and a processor for executing the stored program.

The memory may include volatile memories, such as a static random access memory (S-RAM), a dynamic random access memory (D-RAM), and the like, and non-volatile memories, such as a flash memory, a read only memory (ROM), an erasable programmable ROM (EPROM), an electrically erasable programmable ROM (EEPROM), and the like.

Information required to be stored even when power of the display device 10 is turned off may be stored in a non-volatile memory, and information temporarily required to execute a program may be stored in a volatile memory.

An inductance value of the inductor 212 may be determined according to the signal reception characteristic of the support unit 100, design considerations, or the like.

Referring to FIG. 11, a low noise amplifier 213 may be further included in an output terminal of the matching circuit forming the matching unit 210. As one example, the low noise amplifier 213 may be implemented as a differential amplifier.

The low noise amplifier 213 may improve a reception rate of the support unit 100 even in a weak electric field area by amplifying an RF signal input to the tuning unit 220 and compensating an antenna gain thereof.

Figure 12:
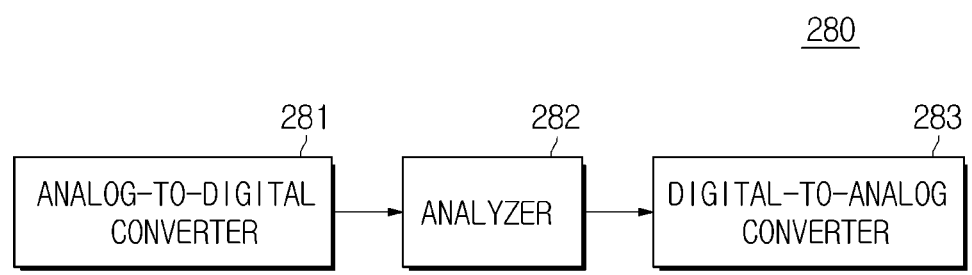
FIG. 12 is a control block diagram illustrating a detection unit configured to detect a signal reception characteristic.

FIG. 12 is a control block diagram illustrating a detection unit configured to detect the signal reception characteristic.

As described above, the support unit 100 may have various signal reception characteristics according to the shape or material thereof, and each of the broadcast channels has a different allocated frequency band. Accordingly, as shown in FIG. 12, the body 200 may further include a detection unit 280 configured to detect a signal reception characteristic of the support unit 100 to adaptively adjust the signal reception characteristic thereof.

The detection unit 280 may detect the signal reception characteristic of the support unit 100, that is, an S parameter, by measuring a ratio of an input voltage to an output voltage in a frequency domain.

To this end, the detection unit 280 may include an analog-to-digital converter 281 configured to convert an analog input signal into a digital signal, an analyzer 282 configured to detect an S parameter by analyzing the input signal, and a digital-to-analog converter 283 configured to convert a result of the detection into an analog signal.

For example, the analyzer 282 may be implemented as a network analyzer. In this case, the analyzer 282 checks an output voltage for each port (an input port and an output port are identical because a support unit serves as an antenna) in each frequency, and the output voltage is divided by an input voltage. A ratio having a maximum value becomes a magnitude of an S parameter, and a delay between two signals becomes a phase difference. However, the analyzer 282 doesn't have to be implemented as the network analyzer, and, as described above, as long as the analyzer 282 may detect a signal reception characteristic of the support unit 100, a kind, a circuit configuration, or the like of the analyzer 282 is not limited.

The detection unit 280 may be included in a main system on chip (SoC) on which the control unit 240, the signal processing unit 230, and the like of the display device 10 are mounted. In this case, the detection unit 280 may share converters provided in the main SoC without the analog-to-digital converter 281 or the digital-to-analog converter 283 being separately provided, and may also use a processor provided in the main SoC without the analyzer 282 being separately provided.

Alternatively, the detection unit 280 may be included in the matching unit 210.

An operation for adaptively adjusting a signal reception characteristic will be described using the detection unit 280. For example, when the user selects a channel 1, the detection unit 280 transmits an S parameter of the support unit 100 to the control unit 240 by detecting the S parameter, and the tuning unit 220 transmits frequency information allocated to the selected channel 1 to the control unit 240.

The control unit 240 determines a shift value of the S parameter to receive a broadcast signal corresponding to the channel 1 on the basis of the information transmitted from the detection unit 280 and the tuning unit 220, and transmits a control signal related to the shift to the matching unit 210. The control signal may be input through a control signal port provided in the matching unit 210.

The matching unit 210 may shift the S parameter to be suitable to receive the broadcast signal corresponding to the channel 1 by adjusting capacitance of the variable capacitor according to the input control signal. That is, the matching unit 210 may shift the S parameter to resonate a signal in a frequency band allocated to the channel 1 among the broadcast signals received by the support unit 100.

Subsequently, when the channel is changed, the detection unit 280, the control unit 240, and the matching unit 210 are mutually linked and may adaptively optimize a signal reception environment through the above process. Since an S parameter continuously varying according to a change of a channel is detected and fed back by the detection unit 280, the S parameter may be correctly shifted.

Meanwhile, when the detection unit 280 is included in the main SoC, since the signal received by the support unit 100 is input to the detection unit 280 through the matching unit 210 and the tuning unit 220, the detection unit 280 transmits the S parameter to the control unit 240 by detecting the S parameter on the basis of the input signal and generates a control signal input to the matching unit 210 using the frequency information allocated to the channel 1 and the detected S parameter.

When the matching unit 210 completes a matching process by shifting the S parameter according to the input control signal, the tuning unit 220 may select a signal in the frequency band allocated to the channel 1 from a signal on which a matching process is performed.

Figure 13:
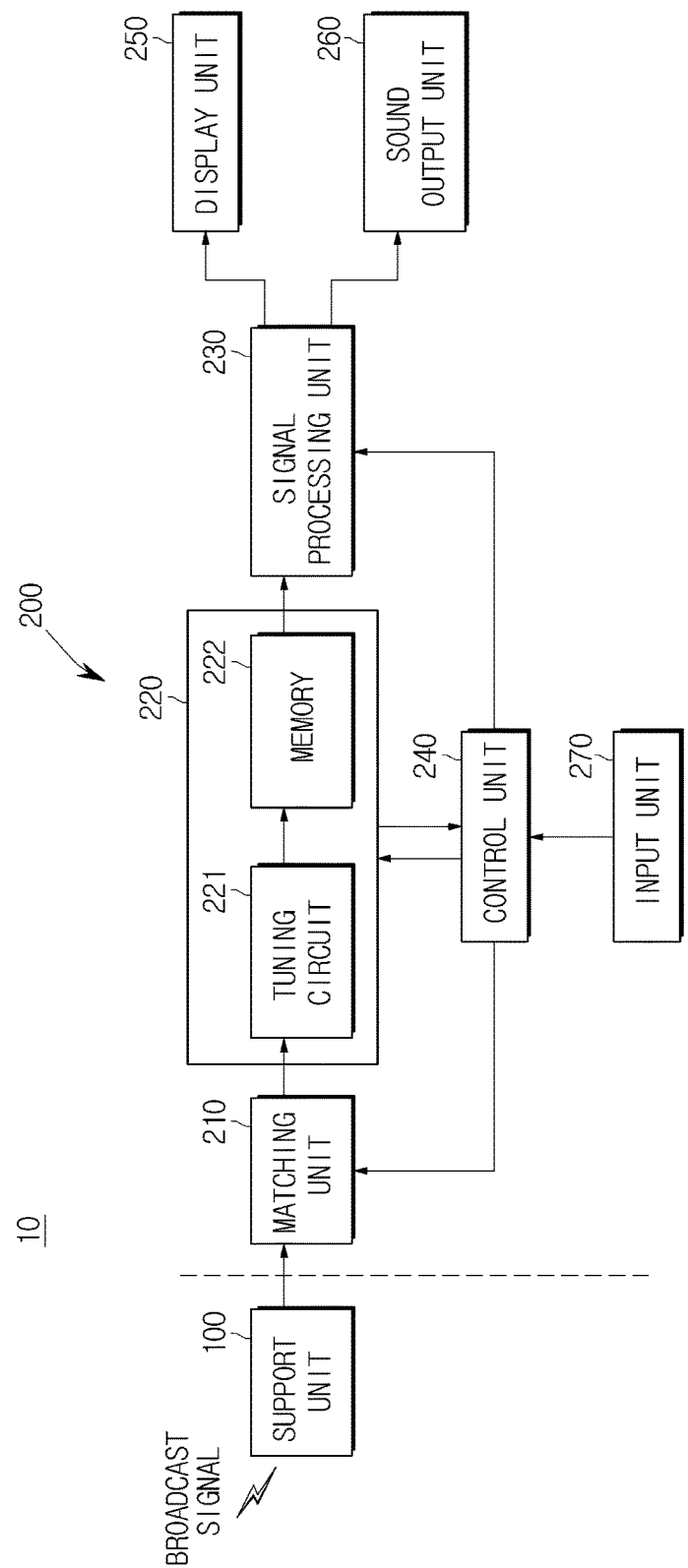
FIG. 13 is a control block diagram illustrating a configuration of a tuning unit.

FIG. 13 is a control block diagram illustrating a configuration of a tuning unit.

Referring to FIG. 13, the tuning unit 220 may include a tuning circuit 221 configured to select a signal in a specific frequency band from an input signal and a memory 222 configured to store frequency information and tuning information for each of broadcast channels.

When a user selects a desired broadcast channel through the input unit 270, the control unit 240 may determine an S parameter shift value of the matching unit 210 with the frequency information allocated to the broadcast channel selected by the memory 222.

Also, tuning information according to the selected broadcast channel, that is, a tuning history of the tuning circuit 221, may also be stored in memory 222. In this case, a current S parameter may be estimated according to the tuning information stored in the memory 222, and a shift value may be determined on the basis of the estimated current S parameter and a frequency band allocated to of a channel changed even when the S parameter is not separately detected when the channel is changed.

That is, even when the detection result of the detection unit 280 is not used, the control unit 240 may determine the shift value of the S parameter on the basis of a frequency band allocated to a previously selected broadcast channel and the frequency band allocated to the currently selected broadcast channel. The above case may be achieved by an embodiment in which the detection unit 280 is not provided and may also be achieved by an embodiment in which the detection unit 280 is provided to primarily detect and store a signal reception characteristic of the support unit 100.

Frequency tuning information may be used when power of the display device 10 is turned on after being turned off or after a channel change command is input by the user. When the power of the display device 10 is turned on after being turned off, the matching unit 210 may match a signal reception characteristic according to frequency tuning information stored immediately before the power is turned off, and the tuning unit 220 may tune a frequency.

Further, when the user inputs a channel change command, the control unit 240 may determine a shift value for matching the signal reception characteristic to be suitable to the changed channel on the basis of the frequency tuning information stored in the memory 222. The frequency tuning information corresponding to the changed channel may also be stored in the memory 222.

The memory 222 may include volatile memories, such as an S-RAM, a D-RAM, and the like, and non-volatile memories, such as a flash memory, a ROM, an EPROM, an EEPROM, and the like.

The memory 222 may store stored information, such as the frequency information and the tuning information for each of the broadcast channels, in the non-volatile memories even when power of the display device 10 is turned off, and may store information, which is temporarily stored for tuning, in the volatile memories.

The tuning circuit 221 may be implemented as either a homodyne structure or a heterodyne structure. The tuning circuit 221 may be implemented as a zero-intermediate frequency (IF) structure for directly down-converting a signal in a frequency band corresponding to the desired broadcast channel to direct current (DC) or may be implemented as a low-IF structure for down-converting the signal to a low frequency between the DC and the IF when implemented as a homodyne structure.

The tuning circuit 221 may include a low noise amplifier disposed in an input terminal thereof, a frequency down-converting mixer for down-converting an amplified low noise RF signal to an IF band or to DC, a local oscillator (LO) configured to supply an LO frequency for frequency synthesizing in the frequency down-converting mixer, a channel selection filter through which only frequencies in a frequency band corresponding to a desired channel among the down-converted signals pass, and the like.

Also, when the tuning circuit 221 is implemented as a homodyne structure or a low-IF structure, an image removal filter configured to filter an image frequency may be further included therein. However, the above components is only one example of the tuning circuit 221, and a design change is possible such that some of the components are omitted or replaced with other components in the tuning circuit 221, or other components may be added to the tuning circuit 221.

Figure 14:
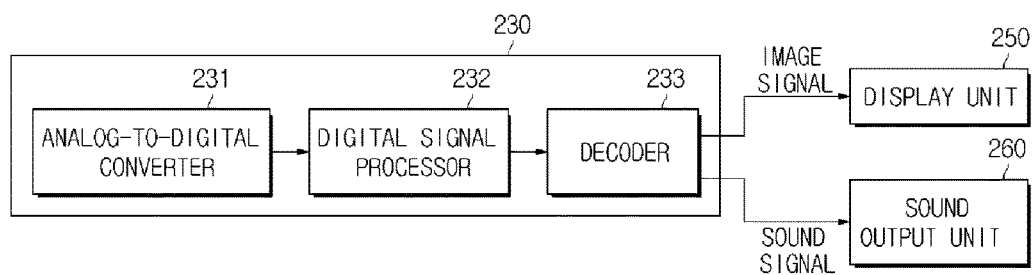
FIG. 14 is a control block diagram illustrating a detailed configuration of a signal processing unit included in the display device according to one embodiment.

FIG. 14 is a control block diagram illustrating a detailed configuration of a signal processing unit included in the display device according to one embodiment.

Referring to FIG. 14, the signal processing unit 230 may include an analog-to-digital converter 231 configured to convert an analog signal output from the tuning unit 220 to a digital signal, a digital signal processor 232 configured to process the digital signal into a type of signal capable of being output to the display unit 250 and the sound output unit 260, and a decoder 233 configured to decode and output an image signal and a sound signal to the display unit 250 and the sound output unit 260, respectively.

Also, the signal processing unit 230 may further include a memory for storing a program and related data for performing an operation of the digital signal processor 232, and the memory may include volatile memories, such as an S-RAM, a D-RAM, and the like, and non-volatile memories, such as a flash memory, a ROM, an EPROM, an EEPROM, and the like.

The signal processing unit 230 may further include a demultiplexer (DEMUX) for separating the image signal and the sound signal from the signal output from the tuning unit 220.

Also, the decoder 233 may include each of a decoder for decoding an image signal and a decoder for decoding a sound signal, and both an image signal and a sound signal may be decoded by one decoder.

The decoder 233 may be implemented as either a software decoder or a hardware decoder.

The configuration shown in FIG. 14 is only one example applicable to the display device 10, and the configuration of the signal processing unit 230 is not limited to the example.

Meanwhile, the display unit 250 from which the image signal is output may display an image signal using various methods such as a cathode ray tube (CRT) method, a liquid crystal display (LCD) method, a light emitting diode (LED) method, an organic light emitting diode (OLED) method, a plasma display panel (PDP) method, a field emission display (FED) method, and the like. However, the embodiments of the display unit 250 are not limited thereto, and, in addition to the above described methods, the display unit 250 may adapt a method for displaying an image signal by which an image signal included in a broadcast signal received by the support unit 100 may be displayed on the display unit 250.

Hereinafter, a structure using an LED method and a structure using an OLED method among the methods of the display unit 250 will be described.

Figure 15:
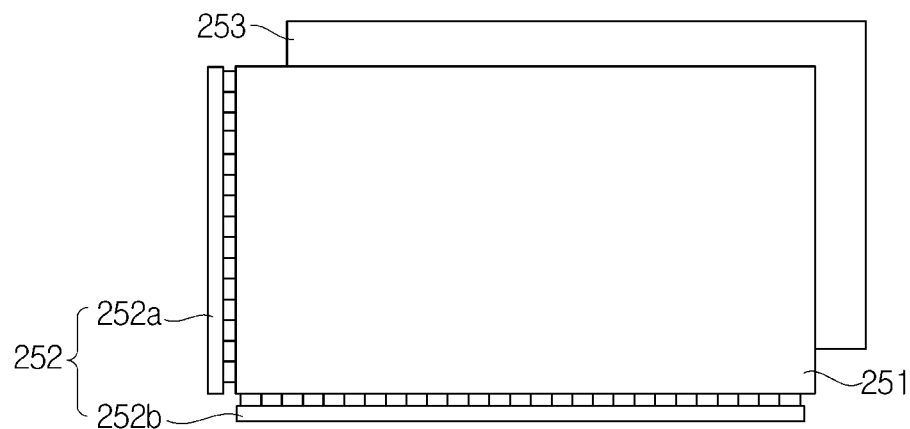
FIGS. 15 to 17 are views illustrating a structure of a display unit including a light emitting diode (LED) panel.
Figure 16:
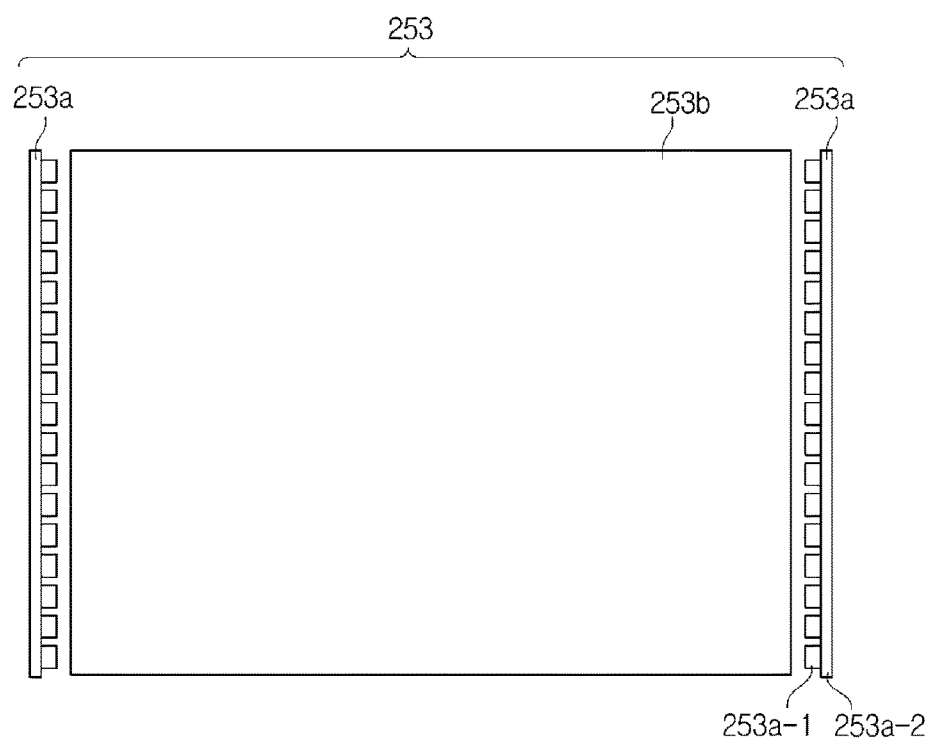
Figure 17:
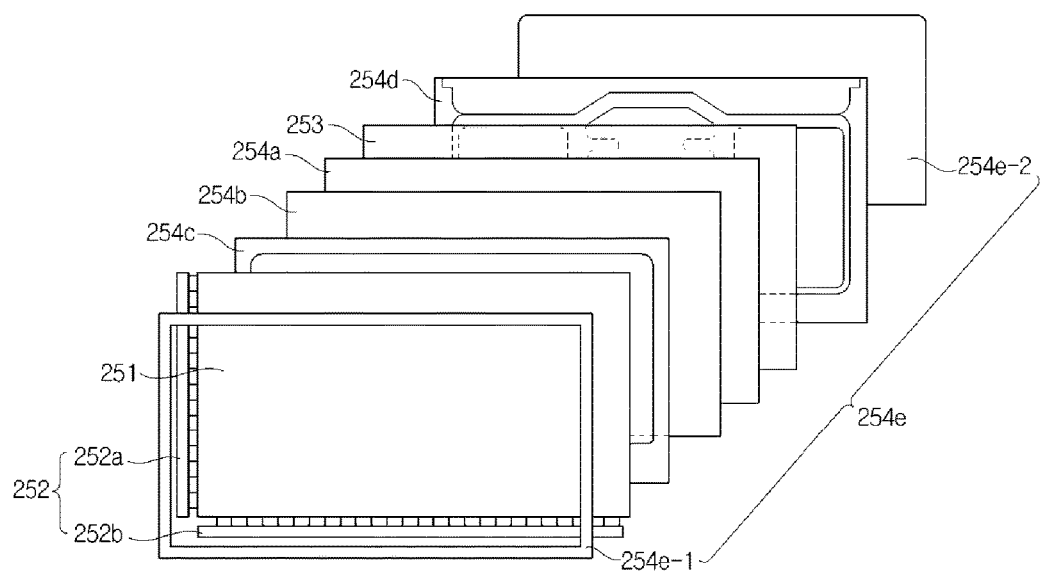
Figure 18:
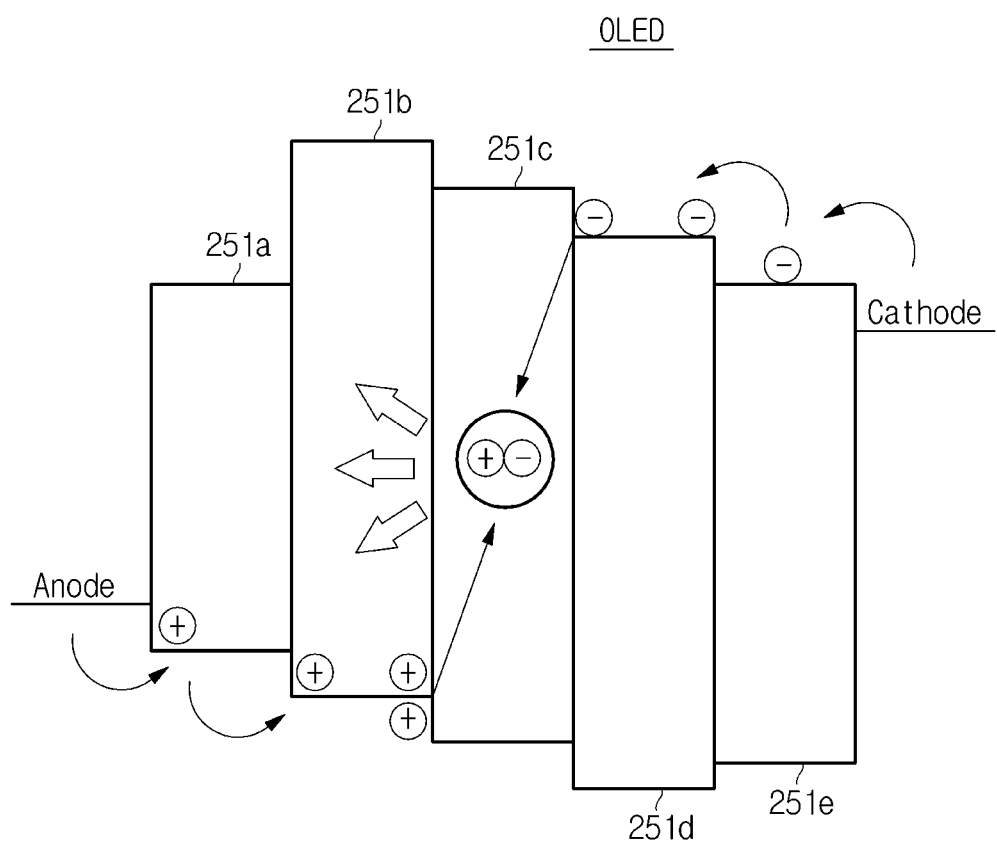
FIG. 18 is a view illustrating a structure of an organic LED (OLED).

FIGS. 15 to 17 are views illustrating a structure of a display unit including an LED panel, and FIG. 18 is a view illustrating a structure of an OLED.

According to an example in FIG. 15, a display unit 250 may include a display panel 251, a panel driving unit 252, and a back light unit (BLU) 253.

The display panel 251 may display image information such as text, numbers, and graphics by adjusting transmittance of light passing through a liquid crystal layer, and the transmittance of the light passing through the liquid crystal layer may be adjusted according to a magnitude of a voltage applied thereto.

The display panel 251 may include a color filter panel, a thin film transistor (TFT) array panel, the liquid crystal layer, and a sealant.

The color filter panel may include red, green, and blue color filters formed in an area corresponding to pixel electrodes of the TFT panel such that a color is displayed for each pixel. Also, a common electrode including a transparent conductive material, such as indium tin oxide (ITO), indium zinc oxide (IZO), or the like, may be formed in the color filter panel.

The TFT panel display panel 251 may be disposed to be spaced apart from the color filter panel and may include a plurality of gate lines, data lines, and pixel electrodes.

Here, the gate lines are arranged in a row direction to transmit gate signals, the data lines are arranged in a column direction to transmit data signals, and the pixel electrodes may be connected to the gate lines and the data lines and include switching components and capacitors.

Here, the switching component is formed on an intersection of the gate line and the data line, and one terminal of the capacitor may be connected to an output terminal of the switching component. The other terminal of the capacitor may be connected to a common voltage or the gate line.

The liquid crystal layer included in the display panel 251 is disposed between the color filter panel and the TFT panel and includes a sealant and liquid crystals accommodated in the sealant. An orientation direction of the liquid crystal layer is changed by an externally applied voltage. At this time, transmittance of light passing through the liquid crystal layer is adjusted.

Meanwhile, the color filter panel, the TFT panel, and the liquid crystal layer of the display panel 251 form a liquid crystal capacitor, and the formed liquid crystal capacitor is connected to the output terminal of the switching component of the pixel electrode and the common voltage or a reference voltage.

The sealant is formed on edges of the color filter panel and the TFT panel of the display panel 251 and couples the color filter panel and the TFT panel. The sealant may maintain a shape of the display panel 251.

The panel driving unit 252 may include a gate driving unit 252a configured to supply a gate pulse to the gate line by generating the gate pulse and a data driving unit 252b configured to supply a data voltage to the data line by generating the data voltage.

The data driving unit 252b selects a gradation voltage for each data line on the basis of image data and transmits the selected gradation voltage to the liquid crystals through the data line.

The gate driving unit 252a transmits an on or off signal on the basis of the image data to a TFT serving as a switching component through a scan line and turns on or turns off the TFT.

That is, when the data driving unit 252b applies a voltage corresponding to each color value, the gate driving unit 252a is driven to apply the voltage received from the gate driving unit 252a to a corresponding pixel.

A source electrode of the TFT is connected to the data line, a gate electrode thereof is connected to the gate line, and a drain electrode thereof is connected to a pixel electrode of the ITO. When a scan signal is supplied to the scan line, the TFT turns on and supplies the data signal supplied from the data line to the pixel electrode.

A predetermined voltage is applied to the common electrode, and thus an electric field is formed between the common electrode and the pixel electrode. An orientation angle of liquid crystals between liquid crystal panels is changed by the electric field, and light transmittance is changed according to the changed orientation angle to display a desired image.

The panel driving unit 252 may implement the desired image on the display panel 251 by providing a gate driving signal and a data driving signal, which are based on a gate control signal, a data control signal, and a related data signal, to the gate line and the data line formed on the TFT panel, respectively.

The BLU 253 includes a direct type BLU in which a light source is disposed on a lower surface of the display panel 251 to emit light thereto, and an edge type BLU in which a light guide plate is installed under the display panel 251 and a light source installed on an edge of the light guide plate emits light thereto. In the present example, the edge type BLU 253 will be described.

As shown in FIG. 16, the BLU 253 includes a plurality of optical modules 253a and a light guide plate 253b disposed between the plurality of optical modules.

Each of the optical modules 253a includes a light source part 253a-1 configured to output light and an optical driving unit 253a-2 configured to drive the light source part 253a-1 so that the light is output from the light source part 253a-1.

Here, the light source part 253a-1 is an LED configured to generate light with high efficiency and low power consumption and may be a printed circuit board (PCB) on which a plurality of LEDs are electrically mounted, and the optical driving unit 253a-2 supplies or cuts off power applied to the LED and adjusts magnitude of the power supplied to the LED.

The light guide plate 253b guides incident light to the display panel 251 and may be formed as a flat plate with a plastic material such as polymethylmethacrylate (PMMA) including an acrylic transparent resin, one of transmissive materials capable of transmitting light, or a polycarbonate (PC) series.

The light guide plate 253b has excellent transparency, weatherproofing, and colorability and thus diffuses light when the light is transmitted thereto.

Referring to FIG. 17, the display unit 250 may further include a diffusion plate 254a, an optical sheet 254b, and a support member 254c disposed between the display panel 251 and the BLU 253, may further include a chassis 254d on a rear surface of the BLU 253, and may further include a housing 254e forming an exterior of the display unit 250 or an exterior of the body 200.

The diffusion plate 254a is disposed between the display panel 251 and the BLU 253 and diffuses the light emitted from the BLU 253 along a surface of the BLU 253 such that color and brightness are uniformly seen throughout a screen.

The diffusion plate 254a may improve luminance and the like of the light emitted from the BLU 253 and may supply the light to the display panel 254. That is, the diffusion plate 254a increases the light emitted from the LED of the BLU 253 and uniformly maintains brightness of an entire surface of the screen.

The optical sheet 254b is a film disposed between the display panel 251 and the diffusion plate 254a and may include a prism film on which a prism is formed and a dual brightness enhancement film (DBEF) formed by a multi-layer coating process for double refraction.

The prism film may include a plurality of triangular prism-shaped prism patterns, and the plurality of prism patterns may be arranged to be adjacent to each other to form a plurality of band shapes. That is, the prism patterns are arranged in a pattern in which a peak and a valley are repeatedly formed and may be formed to protrude in a direction toward the display panel from a reference surface.

The DBEF is a film configured to reflect some of light absorbed in polarizing plates (not shown) disposed on a front surface and a rear surface of the display panel 251 and provide the reflected light to the polarizing plate again.

More specifically, the DBEF allows some incident light to pass therethrough and reflects the remaining light, and, at this time, the reflected light is regenerated as scattered light by the diffusion plate 254a and the prism film such that the regeneration of the light is repeatedly performed because some of the regenerated scattered light passes through the DBEF again and the remaining light is reflected again. Accordingly, optical loss may be minimized That is, the DBEF may improve light efficiency by regenerating polarized light that does not pass through the polarizing plate.

The optical sheet 254b improves characteristics of light using a method, which uniformly diffuses luminance of the light output from the light guide plate 253b or collects high luminance light, and the light having improved characteristics is supplied to the display panel 251.

The support member 254c supports the display panel 251, the diffusion plate 254a, the optical sheet 254b, and the BLU 253.

Also, the support member 254c maintains a distance between the display panel 251 and the optical sheet 254b, a distance between the diffusion plate 254a and the optical sheet 254b, and a distance between the diffusion plate 254a and the BLU 253.

The chassis 254d is a panel configured to connect various components required to display an image and output a sound, and various PCBs, input and output devices, and the like are mounted on the chassis 254d. The chassis 254d may be made of a metal having excellent heat dissipation and strength.

The housing 254e includes a bezel 254e-1 and a back cover 254e-2. Here, the bezel 254e-1 fixes the display panel 251 supported by the support member 254c and is detachably coupled to the support member 254c or the back cover 254e-2.

The bezel 254e-1 forms an accommodation space when coupled to the back cover 254e-2, and the display panel 251, the BLU 253, the diffusion plate 254a, the optical sheet 254b, the chassis 254d, and the like are disposed in the accommodation space.

Hereinafter, a case in which the display unit 250 includes an OLED panel will be described.

When the OLED panel is adapted as the display unit 250, a BLU doesn't have to be provided to the display unit 250 because an OLED including a self-light emitting element is disposed in a pixel region formed when the above described gate line and the above described data line intersect.

As shown in FIG. 18, an OLED disposed in each pixel forming the display panel 251 may include organic compound layers such as a hole injection layer 251a, a hole transport layer 251b, an emission layer 251c, an electron transport layer 251d, an electron injection layer 251e, and the like stacked between an anode and a cathode thereof.

An input image may be reproduced using a phenomenon in which a current flows in a fluorescent thin film or a phosphorescent organic thin film so that light is emitted when electrons and holes in the OLED disposed in each of the pixels are combined in an organic layer.

When the display unit 250 includes the OLED panel, the display unit 250 may be variously classified according to a type of an emitting material, a light emitting method, a light emitting structure, a driving method, and the like. The display unit 250 may be classified as a fluorescent light emitter and phosphorescent light emitter according to the light emitting method, and may be classified into a top emission structure and a bottom emission structure according to the light emitting structure. Also, the OLED may be classified into a passive matrix OLED and an active matrix OLED according to the driving method.

Hereinafter, a feed structure for connecting the body 200 and the support unit 100 will be described.

Figure 19:
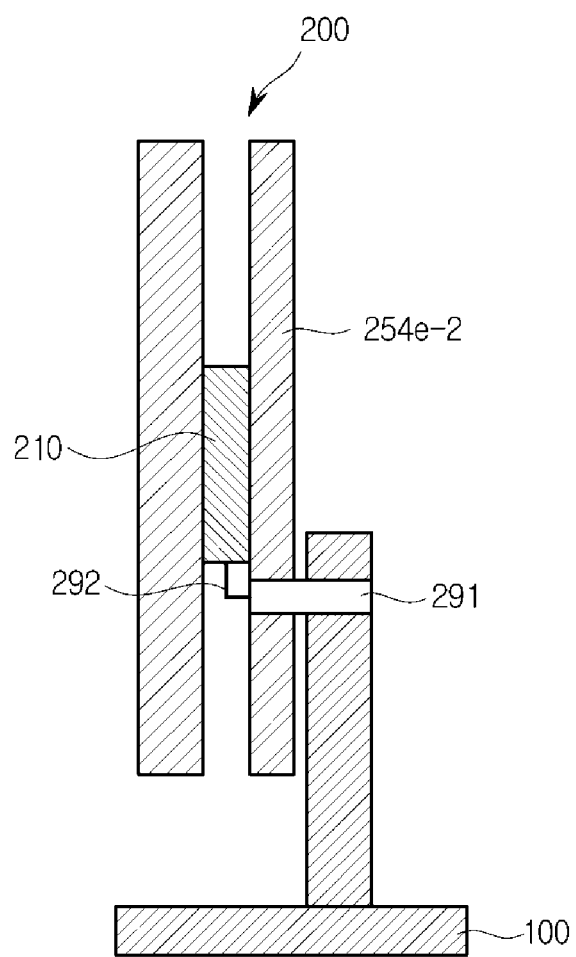
FIGS. 19 and 20 are views illustrating examples of a feed structure applicable to the display device according to one embodiment.
Figure 20:
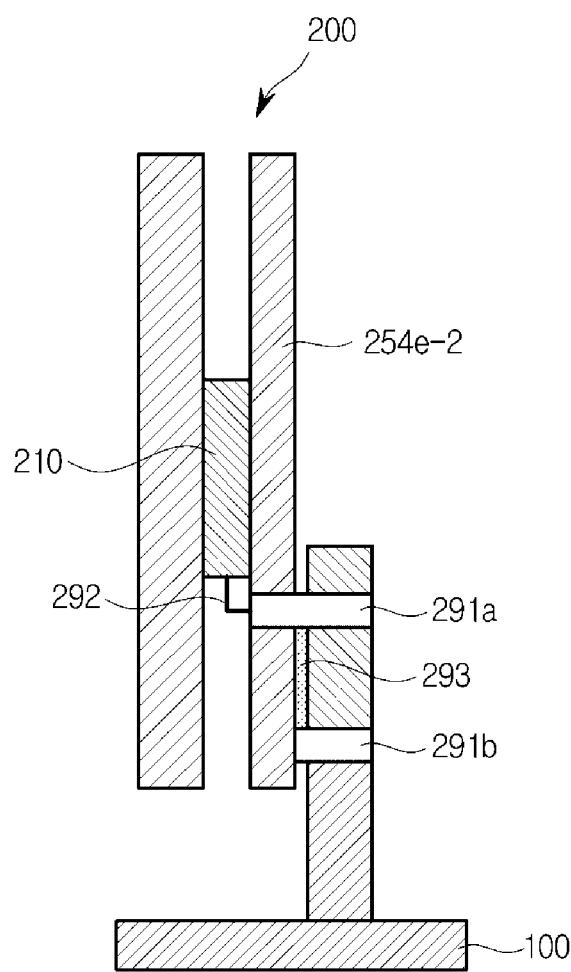

FIGS. 19 and 20 are views illustrating examples of a feed structure applicable to the display device according to one embodiment. In the present examples, support unit 100 in a stand type will be described as the example.

According to the example in FIG. 19, a matching unit 210 may be disposed on an inner side of a back cover 254e-2, and a feed line 292 may connect a support unit 100 and the matching unit 210. At this time, a first metal connecting member 291 may connect the back cover 254e-2 made of a nonmetal material, such as a plastic, and the support unit 100, and may include a screw or may be soldered.

Since one end of the feed line 292 is connected to the first metal connecting member 291 and the other end of the feed line 292 is connected to the matching unit 210, the feed line 292 may connect the support unit 100 and the matching unit 210.

Further, when only the body of the support unit 100 is made of a metal material and a neck portion of the support unit 100 is made of a nonmetal material such as a plastic, as shown in FIG. 20, two first metal connecting members 291a and 291b are arranged in a vertical direction and installed on the neck portion of the support unit 100 and a second metal connecting member 293 connects the first metal connecting members 291a and 291b so that the non-conductivity of the neck portion of support unit 100 may be overcome.

Since one end of the feed line 292 is connected to the upper first metal connecting member 291a and the other end of the feed line 292 is connected to the matching unit 210, the feed line 292 may connect the support unit 100 and the matching unit 210.

However, structures in FIGS. 19 and 20 are only examples of a structure capable of connecting the matching unit 210 and the support unit 100, and the embodiment of the display device 10 is not limited thereto.

Meanwhile, since the body 200 may include an external antenna port, when an antenna is connected to the external antenna port, a broadcast signal may be received through the actual external antenna without using the support unit 100 as the antenna. Accordingly, the user may selectively use the support unit 100 as the antenna according to a usage environment of the display device 10 of the display device 10.

In this case, the body 200 may include a switch configured to selectively connect the tuning unit 220 and the support unit 100 or connect the tuning unit 220 and the external antenna port. The tuning unit 220 may receive a broadcast signal received by the support unit 100 when the user selects the support unit 100, and the tuning unit 220 may receive a signal received by the external antenna when the user selects the external antenna port.

Hereinafter, an embodiment of a control method of a display device will be described. Since the display device 10 according to the embodiment described above may be applied to the control method of a display device, the drawings in FIGS. 1 to 20 and descriptions thereof may also be applied to the control method of a display device.

Figure 21:
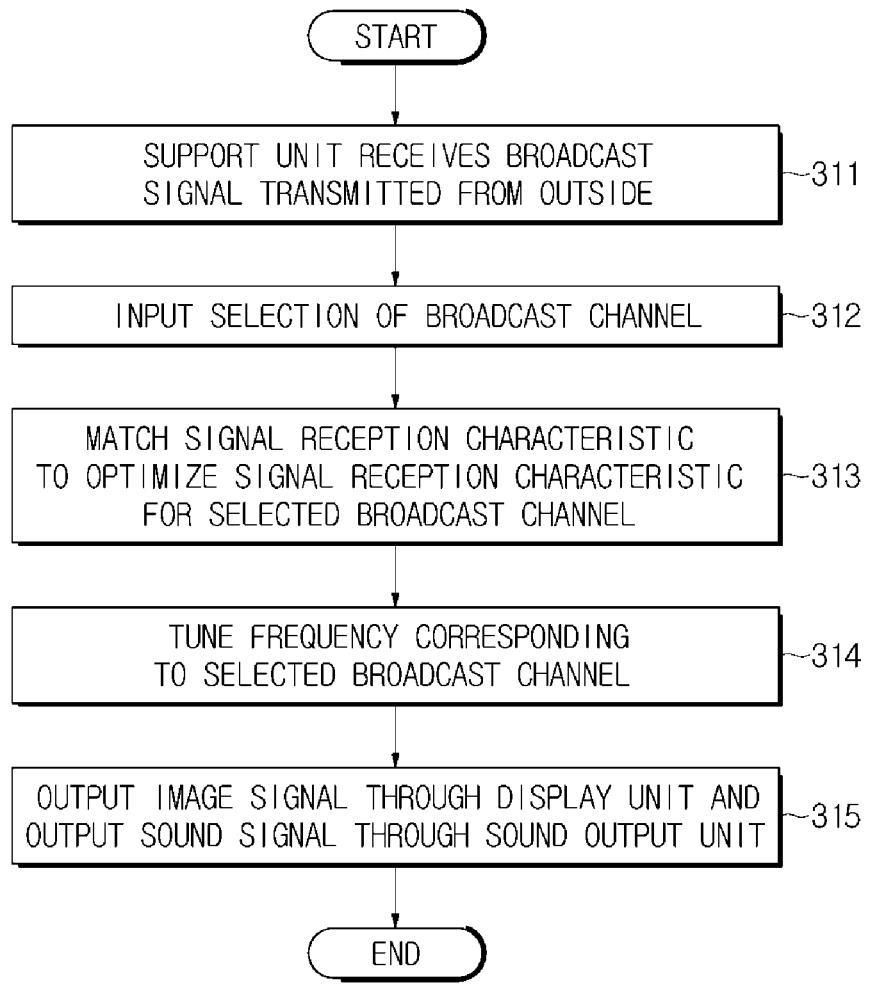
FIG. 21 is a flowchart for describing a control method of a display device according to one embodiment.

FIG. 21 is a flowchart for describing a control method of a display device according to one embodiment.

Referring to FIG. 21, the support unit 100 receives a broadcast signal transmitted from the outside thereof (311). The support unit 100 may be implemented in a stand type to support the body 200 on a lateral plane, as shown in FIG. 1, or the support unit 100 may be implemented in a wall cradle type to fix the body 200 on a wall, as shown in FIG. 6. Also, since all or a part of the support unit 100 is made of a conductive metal material, the support unit 100 may receive an RF type broadcast signal. That is, the support unit 100 may serve as an antenna. The support unit 100 may be made of a metal material and be capable of supporting the body 200, and a specific type and material thereof are not limited.

A selection of a broadcast channel is input by a user (312). The user may select a broadcast channel desired by the user through the input unit 270 provided in the display device 10.

The matching unit 210 matches a signal reception characteristic to optimize the signal reception characteristic for the selected broadcast channel (313). Because the support unit 100 serves as an antenna, the signal reception characteristic may be referred to an S parameter, and the S parameter may be an S11 parameter indicating a reflection coefficient. Since a different frequency band is allocated to each broadcast channel, the matching unit 210 matches the S parameter to optimize the S parameter for the selected broadcast channel Specifically, as shown in the graph of FIG. 7, the S11 parameter of the support unit 100 is currently optimized to receive a signal in the frequency band $F_R$, and when a frequency band allocated to the broadcast channel selected by the user corresponds to the frequency band $F_R'$, the matching unit 210 may match S11 parameter to the frequency band $F_R'$ by shifting the S11 parameter toward the left side in the graph.

The matching unit 210 may provide a matching circuit including at least one variable capacitor and at least one inductor to adjust the S11 parameter, and may shift the S11 parameter by adjusting a variable capacitor value. At this time, since the variable capacitor value may be adjusted on the basis of a control signal output from the control unit 240, the control unit 240 may determine a shift value of the S11 parameter on the basis of information about the frequency band allocated to the selected broadcast channel, and may input information about the determined shift value to the matching unit 210 by including the information in the control signal.

When the broadcast signal received by the support unit 100 is output through the matching unit 210, the broadcast single is input to the tuning unit 220. The broadcast signal output from the matching unit 210 may be a broadcast signal on which a matching process is performed.

The tuning unit 220 tunes a frequency of the input broadcast signal to a frequency corresponding to the selected broadcast channel (314). The tuning unit 220 may select a signal in the frequency band corresponding to the selected broadcast channel from the input broadcast signal.

When the tuning of the frequency is completed, an image signal is output through the display unit 250 and a sound signal is output through the sound output unit 260 (315). The display unit 250 may display the image signal using various methods such as a CRT method, an LCDmethod, an LED method, an OLED method, a PDP method, an FED method, and the like. However, the embodiments of the display unit 250 are not limited thereto, in addition to the above described methods, the display unit 250 may adapt a method for displaying an image signal by which an image signal included in a broadcast signal received by the support unit 100 may be displayed on the display unit 250.

Meanwhile, frequency tuning information of the tuning unit 220, that is, a frequency tuning history, may be stored in memory 222. Also, information about the frequency band allocated to each of the broadcast channels may be stored in the memory 222.

The frequency tuning information may be used when power of the display device 10 is turned on after being turned off or when a channel change command is input by the user. When the power of the display device 10 is turned on after being turned off, the matching unit 210 may match the signal reception characteristic according to the frequency tuning information stored immediately before the power is turned off, and the tuning unit 220 may tune the frequency.

Further, when the user inputs a channel change command, the control unit 240 may determine a shift value for matching the signal reception characteristic to be suitable to the channel to which the display unit is changed on the basis of the frequency tuning information stored in the memory 222. The frequency tuning information corresponding to the channel to which the display unit is changed may also be stored in the memory 222.

Meanwhile, a signal characteristic of the support unit 100 may be directly detected and used to determine a shift value, and this will be described with reference to FIG. 22.

FIG. 22 is a flowchart for describing an embodiment including a process of detecting a signal reception characteristic in the control method of a display device according to one embodiment.

Referring to FIG. 22, the support unit 100 receives a broadcast signal transmitted from the outside thereof (321).

A selection of the broadcast channel is input by a user (322).

The detection unit 280 detects a signal reception characteristic of the support unit 100 (323). The signal reception characteristic varies according to a shape or material of the support unit 100, and a different frequency band is allocated to each broadcast channel. Accordingly, the body 200 may include and use the detection unit 280 configured to detect the signal reception characteristic of the support unit 100 to match the signal reception characteristic. As one example, the detection unit 280 may include the analog-to-digital converter 281 configured to convert an analog input signal into a digital signal, the analyzer 282 configured to detect an S parameter by analyzing the signal, and the digital-to-analog converter 283 configured to convert the result of the detection into an analog signal.

The control unit 240 determines a shift value to optimize the signal reception characteristic of the selected broadcast channel (324). The control unit 240 may determine a shift value of a current signal reception characteristic of the support unit 100 on the basis of the signal reception characteristic detected by the detection unit 280 and frequency information of the broadcast channel received from the tuning unit 220.

The signal reception characteristic is matched according to the determined value (325). When the control unit 240 inputs information about the determined shift value to the matching unit 210, the matching unit 210 suitably matches the signal reception characteristic to the selected broadcast channel by adjusting a variable capacitor value according to an input control signal.

When the broadcast signal received by the support unit 100 is output through the matching unit 210, the broadcast signal is input to the tuning unit 220. The tuning unit 220 tunes a frequency of the input broadcast signal to the frequency corresponding to the selected broadcast channel (326). The tuning unit 220 may select a signal of a frequency corresponding to the selected broadcast channel from the input broadcast signal.

When frequency tuning is completed, an image signal is output through the display unit 250 and a sound signal is output through the sound output unit 260 327.

According to the above-described display device and the method of controlling the same, a user can receive a broadcast signal through a support unit configured to support a body of the display device to view a terrestrial broadcast even in an environment in which it is difficult to provide a separate antenna.

Also, since a matching circuit configured to match a signal reception characteristic is disposed between a support unit and a tuning unit to be able to optimize a signal reception characteristic according to a shape or material of a support unit to be suitable to receive a broadcast desired by a user desires.

Also, by using previous frequency tuning information or by directly detecting a signal reception characteristic of a support unit, the signal reception characteristic can be adaptively matched.

The invention claimed is:

1. A display device comprising:
a support configured to support a body of the display device and receive a broadcast signal transmitted from an outside thereof;
a detector configured to detect a signal reception characteristic of the support;
a matching circuit disposed in the body and configured to match the signal reception characteristic of the support to a frequency band allocated to a broadcast channel;
a tuner configured to select a signal in the frequency band allocated to the broadcast channel among broadcast signals output from the matching circuit; and
a display configured to display an image signal included in the selected signal in the frequency band.

2. The display device of claim 1, wherein the matching circuit includes at least one variable capacitor and at least one inductor.

3. The display device of claim 2, further comprising a processor configured to, when a selection of a broadcast channel is input, control capacitance of the variable capacitor such that the signal reception characteristic matches a frequency band allocated to the selected broadcast channel.

4. The display device of claim 3, wherein the processor generates a control signal for controlling the capacitance of the variable capacitor based on the detected signal reception characteristic and the frequency band allocated to the selected broadcast channel.

5. The display device of claim 4, wherein the processor is configured to determine a shift value of the detected signal reception characteristic for resonating the signal in the frequency band allocated to the selected broadcast channel and determine the capacitance of the variable capacitor according to the determined shift value.

6. The display device of claim 3, wherein the processor is configured to generate a control signal for controlling the capacitance of the variable capacitor based on a frequency band allocated to a previously selected broadcast channel and the frequency band allocated to a currently selected broadcast channel.

7. The display device of claim 1, wherein the signal reception characteristic includes a scattering (S) parameter.

8. The display device of claim 1, wherein:
the support includes a metal material; and
the matching circuit is disposed on an inner surface of a back cover of the body and further includes a feed line configured to connect a neck portion of the support and the matching circuit.

9. A method of controlling a display device including a body configured to display an image signal included in a broadcast signal transmitted from an outside thereof and a support configured to support the body, the method comprising:
receiving, by the support, a broadcast signal;
detecting a signal reception characteristic of the support;
matching the signal reception characteristic of the support to a frequency band allocated to a broadcast channel;
selecting a signal in the frequency band allocated to the broadcast channel among broadcast signals on which a matching process is performed; and
displaying an image signal included in the selected signal in the frequency band.

10. The control method of claim 9, wherein the matching of the signal reception characteristic of the support to the frequency band allocated to the broadcast channel includes inputting the broadcast signal received by the support to a matching circuit including at least one variable capacitor.

11. The control method of claim 10, wherein the matching of the signal reception characteristic of the support to the frequency band allocated to the broadcast channel further includes controlling capacitance of the variable capacitor such that the broadcast signal received by the support is resonated in the frequency band allocated to the broadcast channel.

12. The control method of claim 10, wherein the matching of the signal reception characteristic of the support to the frequency band allocated to the broadcast channel includes determining capacitance of the variable capacitor based on the detected signal reception characteristic and the frequency band allocated to the broadcast channel.

13. The control method of claim 10, wherein the matching of the signal reception characteristic of the support to the frequency band allocated to the broadcast channel includes determining a shift value of the detected signal reception characteristic for resonating the signal in the frequency band allocated to the broadcast channel and determining capacitance of the variable capacitor according to the determined shift value.

* * * * *